US006056008A

United States Patent [19]
Adams et al.

[11] Patent Number: 6,056,008
[45] Date of Patent: May 2, 2000

[54] INTELLIGENT PRESSURE REGULATOR

[75] Inventors: Paul R. Adams; Karl J. Gabel, both of Marshalltown, Iowa; Daniel G. Roper, Lucas, Tex.

[73] Assignee: Fisher Controls International, Inc., Clayton, Mo.

[21] Appl. No.: 08/934,943

[22] Filed: Sep. 22, 1997

[51] Int. Cl.[7] .................................................. F16K 31/40
[52] U.S. Cl. ................................... 137/487.5; 137/492.5; 137/505.14; 137/505.41
[58] Field of Search ............................. 137/487.5, 492.5, 137/505.41, 505.14; 251/129.04

[56] References Cited

U.S. PATENT DOCUMENTS

| | | | |
|---|---|---|---|
| 2,881,792 | 4/1959 | Spence | 137/505.41 |
| 2,975,976 | 3/1961 | Smith et al. | |
| 3,225,785 | 12/1965 | Goike | 137/487.5 |
| 3,890,992 | 6/1975 | Wolz et al. | 137/487.5 |
| 4,029,122 | 6/1977 | Jaegtnes | 137/551 |
| 4,084,539 | 4/1978 | Schmidt | 118/8 |
| 4,722,360 | 2/1988 | Odajima et al. | 137/487.5 |
| 4,724,865 | 2/1988 | Hirano et al. | 137/487.5 X |

(List continued on next page.)

FOREIGN PATENT DOCUMENTS

| | | | |
|---|---|---|---|
| 0 339 370 A2 | 11/1989 | European Pat. Off. | G05D 16/20 |
| 0 462 432 A2 | 12/1991 | European Pat. Off. | G05D 7/06 |
| 0 637 713 A1 | 2/1995 | European Pat. Off. | F16K 37/00 |
| 0 660 017 A1 | 6/1995 | European Pat. Off. | F16K 37/00 |
| 0 699 984 A2 | 3/1996 | European Pat. Off. | G05D 16/20 |
| 0 708 389 A1 | 4/1996 | European Pat. Off. | G05B 9/02 |
| 42 18 320 A1 | 12/1993 | Germany | G01M 13/00 |
| WO 97/16776 | 5/1997 | WIPO | G05B 19/048 |
| WO 97/18452 | 5/1997 | WIPO . | |

OTHER PUBLICATIONS

Tescom ICD Catalog Electronic Control Systems; http://www.tescom.com/icd/brocure/i_ecd.htm.
High Pressure Miniature; Pressure Reducing Regulator; BB Series.
High Pressure; Pressure Reducing Regulator; 26–1000 Series.
High Pressure; Pressure Reducing Regulator; 44–1100 Series.
High Flow/High Pressure; Pressure Reducing Regulator; 44–1300 Series.
General Purpose; Pressure Reducing Regulator; 44–1800 Series.
Absolute Pressure; Pressure Reducing Regulator; DA Series.
Vacuum Pressure Control; DV Series.
Sensitive/Non–Venting; Pressure Reducing Regulator; 26–1500 Series.
Sensitive/Self–Venting; Pressure Reducing Regulator; 26–1600 Series.
Miniature/Lecture Bottle; Pressure Reducing Regulator; 04 Series.
General Purpose; Pressure Reducing Regulator; 44–2200 Series.
Sensitive/Accurate; Pressure Reducing Regulator; 44–2600 Series.
Accurate; Pressure Reducing Regulator; 44–2800 Positive Seal Series.
High Flow/Purge; Pressure Reducing Regulator; 44–3200 Series.

(List continued on next page.)

*Primary Examiner*—Stephen M. Hepperle

[57] ABSTRACT

An intelligent pressure regulator for maintaining a fluid in a process at a predetermined pressure includes an electronic controller which enhances regulator performance and provides self-diagnostics and communications capabilities. The electronic controller includes a pressure sensor which provides a signal indicating the pressure of the fluid being controlled, an adjusting pressure for adjusting the position of a throttling element; and a PID controller which receives the signal indicating the pressure of the fluid being controlled and applies the adjusting pressure to the actuator in response to the signal.

19 Claims, 12 Drawing Sheets

U.S. PATENT DOCUMENTS

| | | | |
|---|---|---|---|
| 5,047,965 | 9/1991 | Zlokovitz | 364/558 |
| 5,109,692 | 5/1992 | Fitzgerald | 73/168 |
| 5,197,328 | 3/1993 | Fitzgerald | 73/168 |
| 5,245,333 | 9/1993 | Anderson et al. | 340/870 |
| 5,251,148 | 10/1993 | Haines et al. | 364/509 |
| 5,253,669 | 10/1993 | Gray | 137/488 |
| 5,265,637 | 11/1993 | Gassman et al. | 137/82 |
| 5,349,985 | 9/1994 | Fischer | 251/129.04 |
| 5,381,817 | 1/1995 | Gassman et al. | 137/82 |
| 5,427,350 | 6/1995 | Rinkewich | 251/129.04 |
| 5,431,182 | 7/1995 | Brown | 137/85 |
| 5,434,774 | 7/1995 | Seberger | 364/172 |
| 5,439,021 | 8/1995 | Burlage et al. | 137/85 |
| 5,451,923 | 9/1995 | Seberger et al. | 340/310 |
| 5,460,196 | 10/1995 | Yonnet | 137/487.5 X |
| 5,469,877 | 11/1995 | Askew | 137/487.5 |
| 5,499,647 | 3/1996 | Robert | 137/487.5 X |
| 5,502,999 | 4/1996 | Seberger et al. | 73/4 |
| 5,526,838 | 6/1996 | Robert | 137/487.5 X |
| 5,549,137 | 8/1996 | Lenz et al. | 137/86 |
| 5,558,115 | 9/1996 | Lenz et al. | 137/86 |
| 5,573,032 | 11/1996 | Lenz et al. | 137/486 |
| 5,662,137 | 9/1997 | Schegerin | 137/487.5 |
| 5,678,601 | 10/1997 | Engel | 137/486 |

OTHER PUBLICATIONS

Hand Loaded; Pressure Reducing Regulator Two–Stage; 44–3400 Series.
Two Stage/Positive Seal; Pressure Reducing Regulator; PS–3400 Series.
Absolute Pressure; Pressure Reducing Regulator; 44–4600 Absolute Pressure Series.
Absolute Pressure; Pressure Reducing Regulator; 44–5000 Series.
Hydraulic Service; Pressure Reducing Regulator; 54–2000 Series.
Hand Loaded; Hydraulic Back Pressure Regulator; 54–2100 Series.
Hydraulic/High Flow; Pressure Reducing Regulator; 54–2200 Series.
Spring Loaded Air Loaded Dome Loaded; Back Pressure Regulator Hydraulic; 54–2300 Series.
Dome Loaded Air Loaded; Pressure Reducing Regulaotr Hydraulic; 54–2800 Series.
Dome Loaded; Pressure Reducing Regulator; 26–1100 Series.
High Flow Cv=3.3; Dome Loaded/Pressure Reducing; 26–1200 Series.
Dome Loaded; Pressure Reducing Regulator Positive Bias; 44–4000 Series.
High Pressure; Dome Loaded/Pressure Reducing; 44–4200 Series.
Special Bulletin; 269–493 Series Regulator designed for use with ER Controllers.
Miniature; Back Pressure Regulator; BB–3 Series.
High Pressure; Back Pressure Regulator; 26–1700 Series.
Hand Loaded; Back Pressure Regulator; 26–2300 Series.
Dome Loaded; Back Pressure Regulator; Negative Bias; 26–2900 Series.
General Purpose; Back Pressure Regulator; 44–1700 Series.
General Purpose; Back Pressure Regulator; 44–2300 Series.
Absolute Pressure; Back Pressure Regulator; 44–4700 Absolute Pressure Series.
Spring Loaded; Pressure Reducing Regulator; 44–4800 Vaporizing Series.
Flow Control Regulator; 449–209 Series.
World's Smartest Pressure Controller!; Tescom Corporation.
Pressure and Flow Automation Made Easy!; Tescom Corporation.
Electronic Pressure Controller; ER 3000 Series.
User Interface; For ER 3000 Pressure Controller; UI 3000 Series.
Electropneumatic PID Controller; ER 2000 Series.
Motorized Actuator; 70–2000 Series.
Special Bulletin; 269–493 Series Regulator designed for use with ER Controllers.

INTELLIGENT PRESSURE REGULATOR

CROSS-REFERENCE TO RELATED APPLICATION

This application is related to co-pending U.S. patent application entitled "Diagnostic Device and Method for Pressure Regulator," Ser. No. 08/935,176, filed on the same as this application by the same inventors, the entire specification of which is hereby encorporated by reference.

FIELD OF THE INVENTION

The invention relates to fluid pressure regulators and more particularly, to an improved fluid pressure regulator having intelligent electronics and software to enhance performance.

BACKGROUND OF THE INVENTION

In general, the four basic elements of a process control loop include a process variable to be controlled, a process sensor or measure of the process variable's condition, a controller, and a control element. The sensor provides an indication of the process variable's condition to the controller, which also contains an indication of the desired process variable condition, or the "set point." The controller compares the process variable's condition to the set point and calculates a corrective signal, which it sends to the control element to exert an influence on the process to bring it to the set point condition. The control element is the last part of the loop, and the most common type of final control element is a valve, though it may also comprise a variable speed drive or a pump, for example.

A pressure regulator is a simple, self-contained control system that combines the process sensor, the controller and the valve into a single unit. Pressure regulators are widely used for pressure control in fluid distribution applications and the process industries, for example, to maintain a desired, reduced outlet pressure while providing the required fluid flow to satisfy a variable downstream demand. Pressure regulators fall generally into two main categories: direct-operated regulators and pilot-operated regulators.

A typical prior art direct-operated regulator 11 is illustrated in FIG. 1. Typical applications for direct-operated regulators include industrial, commercial, and gas service; instrument air or gas supply; fuel gas to burners; water pressure control; steam service; and tank blanketing. The direct-operated regulator 11 includes a regulator body 12 which has an inlet 13 and an outlet 14. A fluid flow passage area 15 having a restriction area 16 connects the inlet 13 and outlet 14. The restriction area 16 has a throttling element 17, such as a plug, membrane, vane, sleeve or similar restricting device which, when moved, limits the flow of the fluid (gas or liquid). An actuator including a sensing element having two sides responds to variations in the fluid pressure being controlled. Examples of sensing elements include membranes, diaphragms or pistons. The embodiment illustrated in FIG. 1 uses a diaphragm 18 for the sensing element. Control pressure is applied to the first side, or control side 19 of the sensing element via a control line or a passage 20 internal to the regulator body 12. If a control line is used for this purpose, it may be integral to the regulator body 12 or located in the adjacent piping. The second side, or reference side 21 of the sensing element is typically referenced to atmosphere. An additional force such as a spring 22 may be applied to the actuator, which biases the throttling element into a predetermined position representing a set point.

The direct-operated regulator 11 illustrated in FIG. 1 is considered a "pressure reducing" regulator because the sensing element (diaphragm 18) is connected by an internal passage 20 to pressure downstream of the regulator (on the fluid outlet-side) 14. An increase in downstream pressure is applied to control side 19 through the internal passage 20, applying pressure to the diaphragm 18, and forcing it up against the force of the spring 22. This, in turn, moves the throttling element up into the flow restriction area 16, reducing the fluid pressure to the regulator outlet 20.

Pressure reducing regulators regulate flow by sensing the pressure downstream of the regulator. A typical application of a pressure reducing regulators is on steam boilers, where pressure reducing regulators provide the initial pressure regulation. If the diaphragm 18 were connected to upstream pressure and the throttling element 17 were moved to the other side of the restrictor 16, the direct-operated regulator 11 would be considered a "back pressure" regulator. Back pressure regulators are applied, for example, in association with compressors to ensure that a vacuum condition does not reach the compressor.

A pilot-operated regulator is similar in construction to a direct-operated regulator. A typical prior art pressure reducing pilot operated regulator 23 is illustrated schematically in FIG. 2A, and a prior art back pressure pilot operated regulator is illustrated in FIG. 2B. The pilot operated regulator includes all the structural elements of the direct operated regulator with the addition of the pilot 24 (also called a relay, amplifier, or multiplier). The pilot is an auxiliary device which amplifies the loading pressure on the regulator actuator to regulate pressure. The pilot is similar in construction to a self operated regulator, having essentially the same elements as the self operated regulator.

In the pilot operated regulator 23 illustrated in FIG. 2A and FIG. 2B, inlet pressure is supplied via a pressure tap 27 in the piping upstream of the regulator 23. In the back pressure pilot operated regulator 23 in FIG. 2B, the pressure tap 27 further may include a restriction 26 therein. Inlet pressure to the pilot may also be supplied through an integral pressure tap to the regulator body. Outlet pressure is fed back through piping 20 connected downstream of the regulator 23. The downstream pressure is connected to the pilot 24 and the main regulator 10. The pilot 24 amplifies the pressure differential across the main regulator diaphragm 18 in order to control either the upstream (back pressure) or downstream (pressure reducing) fluid pressure.

Pressure regulators have many advantages over other control devices. Regulators are relatively inexpensive. They generally do not require an external power source to perform the pressure control function; rather, regulators use the pressure from the process being controlled for power. Further, the process sensor, controller and control valve are combined into a relatively small, self-contained package. Other advantages include good frequency response, good rangeability, small size, and there is generally little or no stem leakage.

There are also disadvantages associated with known regulators. Significant problems associated with existing pressure regulators include "droop" and "build-up," also referred to as offset or proportional band. Droop is defined as the decrease in controlled pressure in a pressure reducing regulator and build-up is defined as an increase in controlled pressure for a back pressure regulator that occur when moving from a low load to full load flow condition. They are normally expressed as a percent. Droop and build-up are especially prevalent with direct-operated regulators, but it also exists to a lesser degree with known pilot-operated regulators.

Regulators are often required to go to a no flow condition which is referred to as "lock-up" or "reseat." In a pressure reducing regulator such as the self operated regulator 11 in FIG. 1 or the pilot operated regulator 23 in FIG. 2A, down stream pressure may reach a point where it is desirable for the regulator 11 to completely stop fluid flow. At this down stream pressure, the control pressure fed back to the diaphragm 18 moves the throttling element 17 completely into the flow restriction area 16, thereby blocking flow. This condition is known as "lock-up." In a back pressure regulator such as the pilot operated regulator 23 shown in FIG. 2B, pressure up stream of the regulator may drop to a level where the regulator is required to shut off flow. In this case, the up stream control pressure falls to a level where the load spring and/or the pilot pressure cause the throttling element 17 to move to a position completely blocking fluid flow. Internal parts problems, contamination or binding in the movement of the internal parts can all contribute to a loss of lock-up capability.

Since a regulator is a self-contained control system, existing regulators typically do not contain the capability to communicate with other portions of a process control system. This creates several drawbacks. Since there is not a means to remotely provide a set point or tune a regulator, they generally must be adjusted manually. Adjustments are made by turning an adjustment knob on the regulator to achieve the desired force on the actuator. This is especially undesirable in remote applications or in processes controlling the pressure of hazardous substances. There are no control room indications of regulator performance, leaving operators to inferentially determine regulator malfunctions through readings of other process indications.

The lack of communications and processing capabilities may also lead to maintainability problems. It is difficult or impossible to closely monitor regulator performance over time, so there is little advance warning of the need to fix or replace a regulator. There is also a lack of advance warnings for impending failure, which is especially troublesome with existing pressure regulators: since they are process powered, they typically do not include a failure mode operation. If the operating diaphragm of a spring-loaded pressure reducing regulator fails, the regulator will open fully. This creates issues if the downstream piping cannot withstand upstream pressure conditions, or if a relief valve that can handle the maximum flow of the regulator is not present. Back-pressure regulators will completely close upon diaphragm failure, creating similar issues for the upstream portion of the process.

It is well known that in many situations to which pressure regulators could be applied, control valves are used instead. The control valve includes a powered actuator which is responsive to externally supplied signals for moving a throttling element to control flow. It has been estimated that properly utilized, regulators could replace control valves in 25% of applications using control valves. The hesitancy to use regulators in place of control valves is due, in large part, to the shortcomings associated with known pressure regulators. Primary concerns include droop characteristics and the lack of remote operability. Process equipment users, however, are continually looking to be more cost competitive. In addition to seeking improvements in process efficiency and up-time with existing process equipment, process equipment users are seeking lower cost solutions to process control. If the above discussed limitations of regulators were eliminated, they could provide a lower cost option for many control valve applications.

U.S. industries spend approximately $200 billion each year in maintenance of plant equipment. This results in maintenance costs representing 15–40% of the cost of goods sold per year. Further, one-third of the dollars spent on maintenance is wasted from unnecessary or ineffective maintenance. For example, since known regulators do not have diagnostics or communications capabilities to exchange information with external systems, they are difficult to troubleshoot. Often, in an attempt to correct unidentified process problems, regulators are replaced, only to learn that the regulator was functioning properly. Changing the regulator may require halting the entire process, resulting in significant lost production time. Improving the performance of process instruments such as pressure regulators as well as improving maintainability through processing capabilities and communications will significantly reduce manufacturing costs.

Thus, a need clearly exists for an improved pressure regulator that compensates for droop characteristics and exhibits improved performance. Further, it would be desirable for the improved regulator to include communication and diagnostic capabilities to allow remote operation and the exchange of data to enhance maintainability. Moreover, these additional features are required concurrently with the need for economical solutions for pressure regulation.

SUMMARY OF THE INVENTION

The present invention addresses the above shortcomings of the prior art by providing an intelligent pressure regulator which enhances regulator performance by including processing and communications capabilities. This is accomplished while maintaining the pressure regulator's existing benefits of simplicity and economy.

In a broad aspect, an exemplary embodiment of the invention provides an intelligent regulator for maintaining a fluid in a process at a predetermined pressure which comprises a fluid inlet, a fluid outlet, a fluid flow passage connecting the inlet and the outlet, and a throttling element moveable within the flow passage for selectively restricting fluid flow through the flow passage. An actuator is coupled to the throttling element for selectively moving the throttling element. The actuator includes a control side and a reference side with a reference load coupled thereto for biasing the throttling element in a predetermined reference position which represents the predetermined pressure. A feedback line applies pressure from the fluid being controlled to the control side to move the actuator against the reference load to move the throttling element within the flow passage to adjust the fluid flow thereby controlling the pressure of the fluid in the process. The invention further includes a pressure sensor which provides a signal indicating the pressure of the fluid being controlled, an adjusting pressure for adjusting the position of the throttling element, and a controller which receives the signal indicating the pressure of the fluid being controlled and applies the adjusting pressure to the actuator in response to the signal. Further embodiments provide capabilities for proportional, integral and derivative (PID) control, diagnostics processing, and communications with external devices.

In accordance with another embodiment of the invention, an electronic controller for a pressure regulator that roughly maintains fluid pressure at a predetermined level by using the pressure of the fluid being controlled to position a throttling element to restrict fluid flow through the self operating pressure regulator is presented, which comprises a pressure sensor which provides a signal indicating the pressure of the fluid being controlled, a processor which receives the signal indicating the pressure of the fluid being controlled and outputs a signal representing an adjustment to the throttling element, and an adjusting pressure which is applied to the throttling element in addition to the pressure of the fluid being controlled in response to the signal output by the processor.

In another broad aspect, a method in accordance with the present invention for compensating for droop in a pressure regulator that roughly maintains fluid pressure at a predetermined level by using the pressure of the fluid being controlled to position a throttling element to restrict fluid flow through the self operating pressure regulator is provided. The method comprises the acts of determining the pressure of the fluid being controlled, calculating an error value by comparing the pressure of the fluid being controlled to the predetermined level, converting the error value to an adjusting pressure, and repositioning the throttling element by applying the adjusting pressure in addition to the pressure of the fluid being controlled to the throttling element.

DETAILED DESCRIPTION OF THE INVENTION

Figure 1:
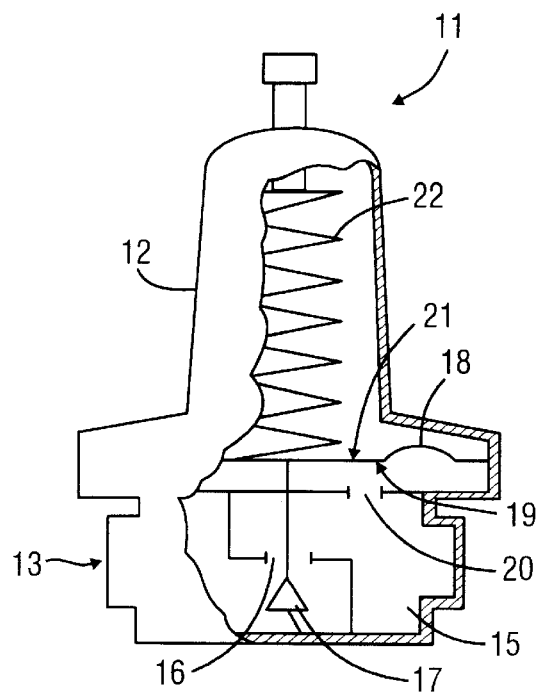
FIG. 1 is a schematic diagram illustrating a typical prior art direct-operated pressure regulator.
Figure 2A:
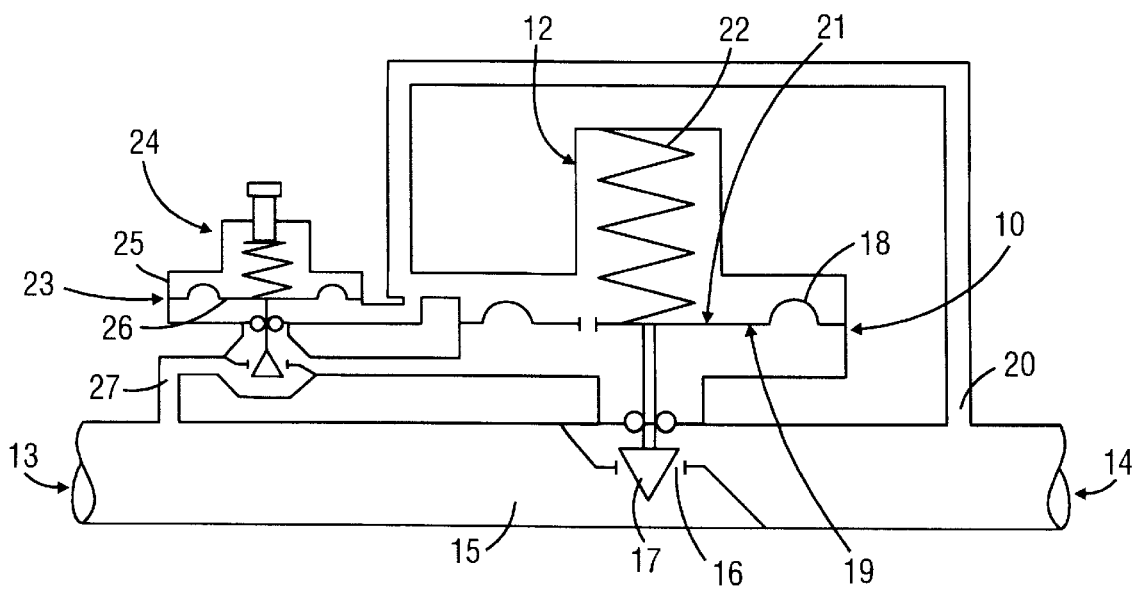
FIG. 2A is a schematic diagram illustrating a typical prior art pilot-operated pressure reducing regulator.
Figure 2B:
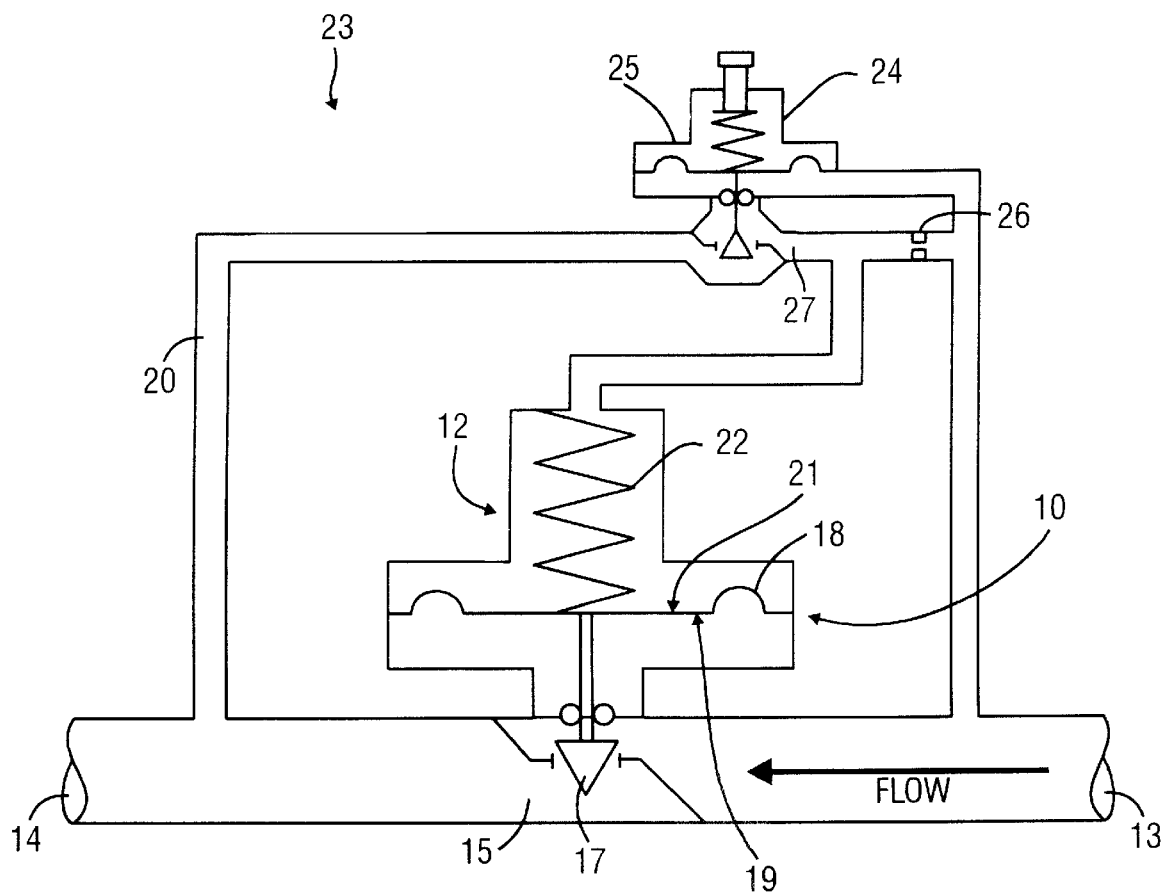
FIG. 2B is a schematic diagram illustrating a typical prior art pilot-operated back pressure regulator.
Figure 3:
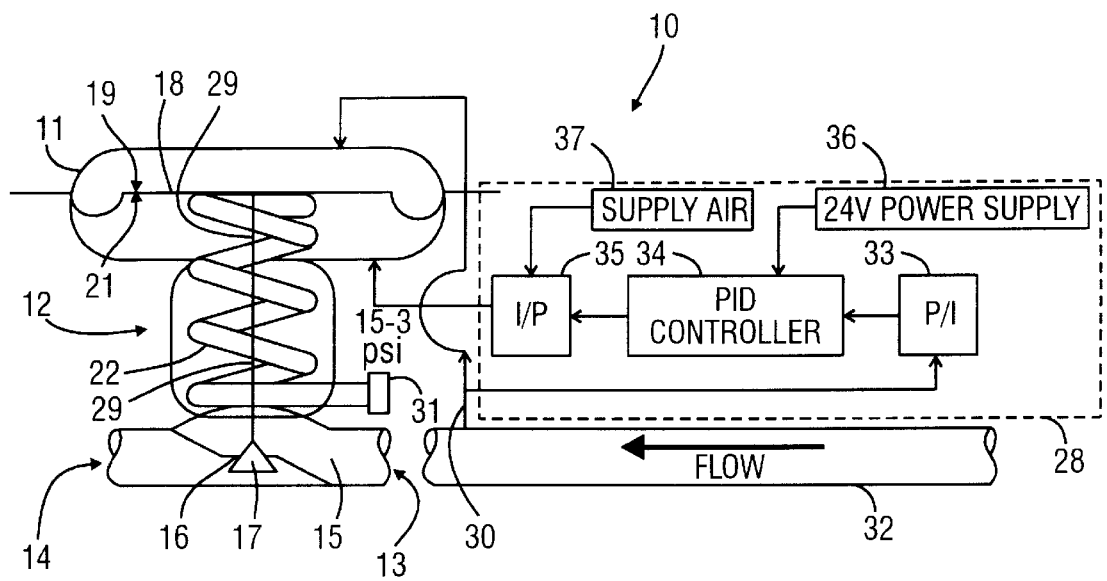
FIG. 3 is a schematic diagram illustrating an exemplary embodiment of a back pressure control intelligent regulator in accordance with the present invention.
Figure 4:
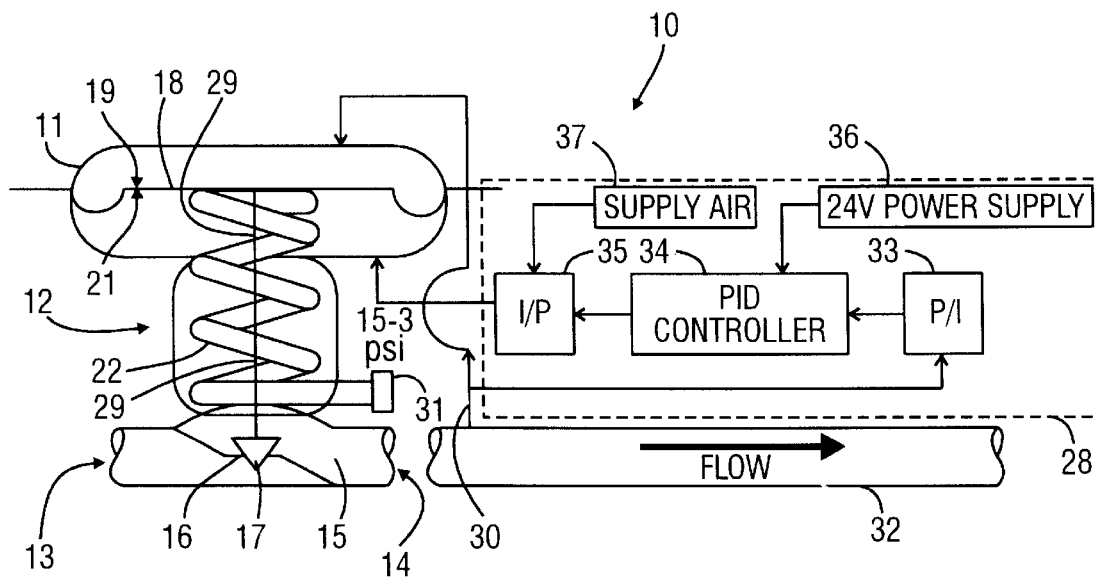
FIG. 4 is a schematic diagram illustrating an exemplary embodiment of a pressure reducing intelligent regulator in accordance with the present invention.

Turning to the drawings and, in particular, FIG. 3 and FIG. 4, two embodiments of an intelligent pressure regulator in accordance with the present invention are illustrated schematically. Each embodiment is referenced generally by the numeral 10 and includes a self operating regulator and an electronic controller (shown surrounded by a broken line in FIG. 3 and FIG. 4). In general, FIG. 3 illustrates an intelligent regulator in accordance with the present invention as used in a back pressure control application, while FIG. 4 illustrates an intelligent regulator in accordance with the present invention in a pressure reducing application. In FIG. 3, fluid flow is from right to left. In FIG. 4, fluid flow is from left to right. The specific embodiments illustrated in FIG. 3 and FIG. 4 include a self operating regulator, but one skilled in the art with the benefit of this disclosure could implement the invention using a pilot operated regulator.

Referring to the figures, the self operating regulator 11 includes a body 12 which comprises a fluid inlet 13, a fluid outlet 14, and a flow passage 15 connecting the inlet 13 and the outlet 14. A flow restriction area 16 is situated within the flow passage 15, and a throttling element 17 functions to restrict fluid flow through the restriction area 16. The throttling element 17 may comprise a plug, membrane, vane, sleeve or other suitable item which when moved within the restriction area 16 throttles the fluid flow. The regulator 10 further includes an actuator including a sensing element, which in the particular embodiments illustrated in FIG. 3 and FIG. 4 comprises a diaphragm 18 which is coupled to the regulator body 12. The sensing element alternately may be in the form of a membrane or a piston. A sliding stem 29 connects the throttling element 17 to the diaphragm 18. The diaphragm 18 includes a control side 19 to which control pressure 30 is applied. The control pressure 30 is connected to the diaphragm 18 by a control line (not shown) or a passage (not shown) within the valve body 12 or external thereto.

The embodiment of the regulator 10 illustrated in FIG. 3 is a back-pressure regulator, since the control pressure 30 is applied to the diaphragm 18 upstream of the regulator 10. A pressure reducing regulator is shown in FIG. 4, with the diaphragm 18 connected to control pressure 30 which is downstream of the regulator 10. The diaphragm 18 further includes a reference side 21 opposite the control side 19 which is referenced to atmosphere. In known regulators, the reference side typically includes a spring 22 or another suitable means such as a weight which applies an additional force to the reference side 21. Additionally, a set screw 31 is positioned to set the initial position of the spring 22.

In the back pressure regulator 10 of FIG. 3, the process fluid is shown flowing through a pipe 32. The spring 22 is biased such that it tends to keep the throttling element 17 in an essentially closed position. The fluid flows into the inlet 13, through the restriction area 16 and goes out through the outlet 14. Control pressure 30 is connected to the control side 19 of the diaphragm 18 in a manner such that system pressure is applied from an upstream location to the control side 19, forcing the diaphragm 18 to move against the spring 22, which moves the stem and the throttling element 17 as necessary to vary flow through the restriction area 16, thus regulating fluid pressure.

The pressure reducing regulator 10 of FIG. 4 operates in a similar manner to the back pressure regulator discussed in association with FIG. 3, except that the control pressure 30 is sensed downstream of the regulator 10 and the throttling element 17 is on the opposite side of the restriction area 16. In the pressure reducing regulator 10, the spring 22 applies force to the reference side 21 of the diaphragm 18 a manner to bias the throttling element 17 in an essentially open position, or out of the flow restriction area 16. Control pressure 30 is applied to the control side 19 of the diaphragm 18 from a downstream location, thus moving the throttling element 17 further into or out of the restriction area 16 to control downstream pressure by regulating flow through the restriction area 16.

With the spring loading system of typical self operating regulators, the controlled pressure tends to decrease as the flow varies from a minimum to maximum rate. This is known as droop in a pressure reducing regulator and build-up in a back pressure regulator (also referred to as proportional band or offset). This invention compensates for droop and build-up and enhances the regulator's accuracy by adding an electronic controller 28, which also receives an indication of the set point and control pressure. The controller compares the set point and control pressure, then applies an adjusting pressure to the reference side of the diaphragm to compensate for the limitations of the regulator's spring mass system.

Figure 5A:
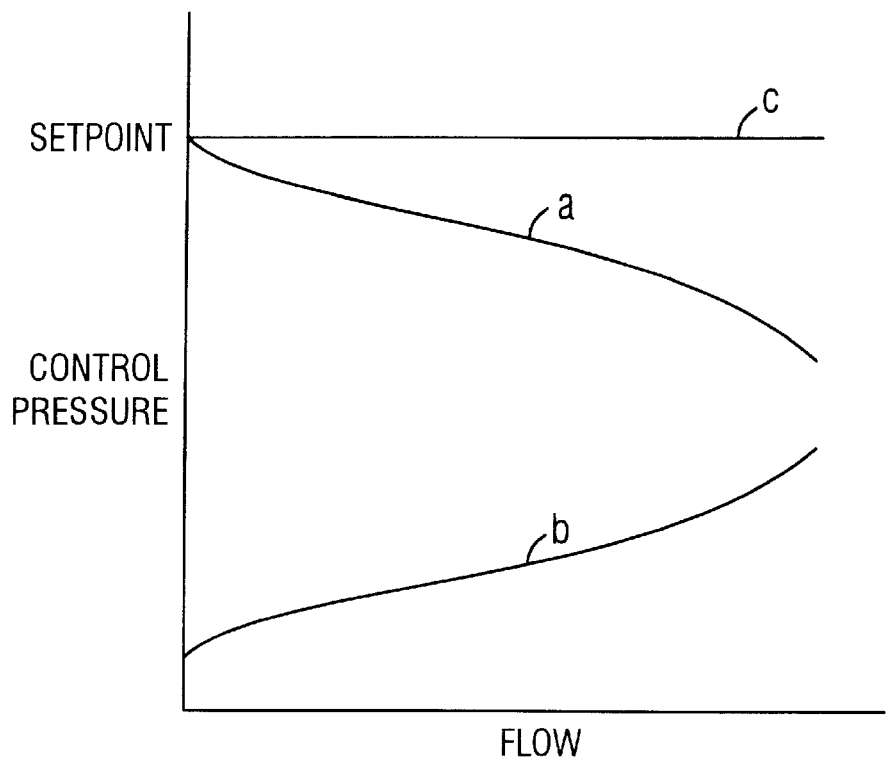
FIG. 5A graphically illustrates the electronic controller's droop compensation function for an embodiment of the invention.

The droop regulation function of the electronic controller is illustrated graphically in FIG. 5A, with control pressure on the y-axis and flow rate on the x-axis. In FIG. 5A, the curve labeled "a" illustrates the droop or offset of a typical self operated pressure reducing regulator, wherein the control pressure decreases as the flow rate increases. The curve labeled "b" illustrates the output of the electronic controller to compensate for the droop exhibited in curve a of FIG. 5A. Ignoring the effects of friction, these curves essentially mirror each other. Curve "c" illustrates the result of combining curves "a" and "b", which equals the set point.

Figure 5B:
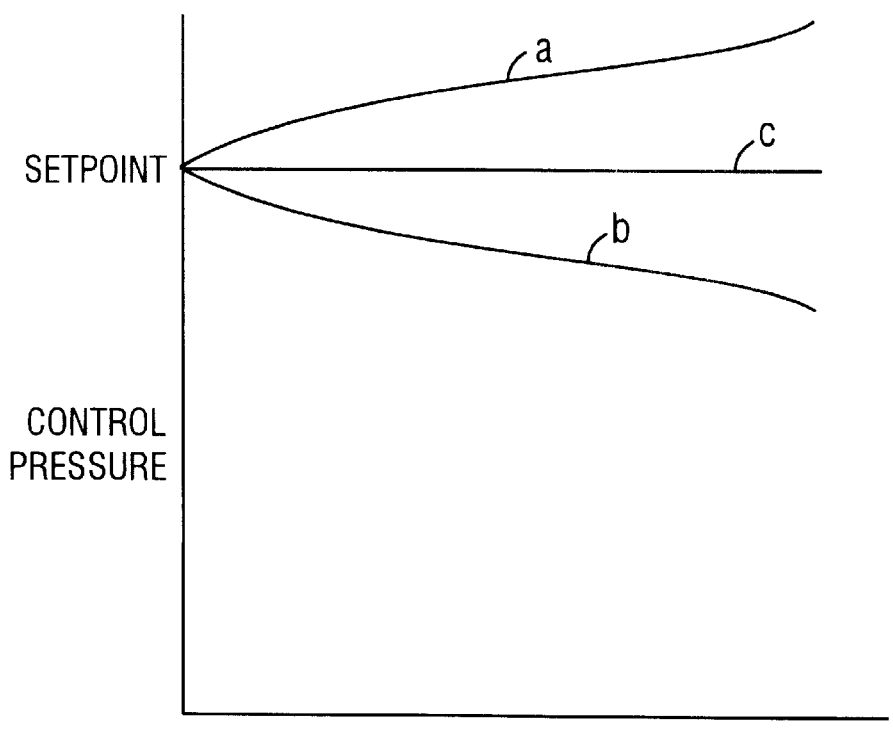
FIG. 5B graphically illustrates the electronic controller's build-up compensation function for an embodiment of the invention.

Similarly, the build-up regulation function is illustrated graphically in FIG. 5B. As with FIG. 5A, the curve labeled "a" in FIG. 5B illustrates the build-up or offset of a back pressure regulator, wherein the control pressure increases as the flow rate increases. The curve labeled "b" illustrates the output of the electronic controller to compensate for the build-up exhibited in curve a of FIG. 5B. Ignoring the effects of friction, these curves essentially mirror each other in a manner similar to the droop curves illustrated in FIG. 5A. Curve "c" illustrates the result of combining curves "a" and "b", which equals the set point.

Referring back to FIG. 3 and FIG. 4, the electronic controller 28 includes a pressure to current (P/I) converter 33, a processor which functions as a proportional, integral and derivative (PID) controller 34, and a current to pressure (I/P) converter 35. The PID controller 34 may be embodied in a microprocessor. The electronic controller 28 is powered by an external power source 36, which is shown as a 24 volt power supply in FIG. 3 and FIG. 4. Power may be provided by a number of suitable power sources including an external power source such as a transformer or loop power from a distributed control system, a power generator internal to the self operating regulator which uses pressure from the process being controlled for an energy source, solar power or battery power. A pressure 37 supplies the I/P converter 35, which provides pneumatic pressure to the reference side 21 of the diaphragm 18 to provide droop or build-up compensation as necessary depending on flow conditions. An alternative to using a pressure supply 37 to provide pneumatic pressure is driving the actuator with an electric motor, in which case the I/P converter 35 would not be included. Rather, the motor would receive a signal directly from the PID controller 34.

Figure 6:
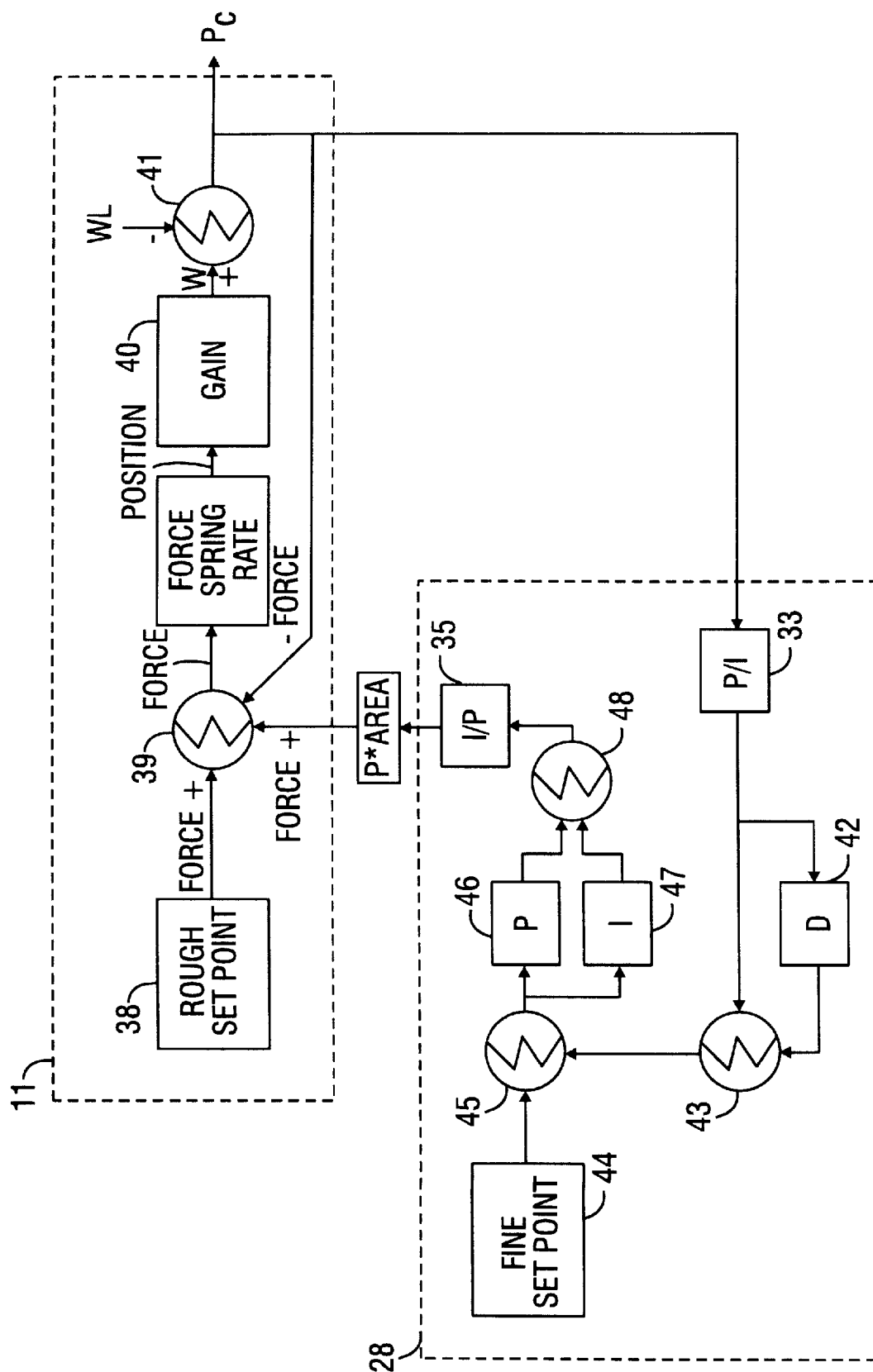
FIG. 6 is a block diagram of the intelligent regulator, highlighting the functional areas of the self operating regulator and electronic controller.

The functional areas of the exemplary embodiment of the intelligent regulator 10 are illustrated in FIG. 6. The rough set point block 38 represents the desired pressure, or set point, which in an embodiment of the invention is in the form of the regulator load spring exerting a force on the reference side of the diaphragm, shown as summing junction 39. The set point 38 is a "rough" set point, since the pressure regulation performed by the self operating regulator 11 is subject to droop. The rough set point 38 is input to the self operating regulator by adjusting a set screw which sets the load of the regulator spring. The force exerted by the regulator load spring against the diaphragm is illustrated as a positive (+) force at the summing junction 39.

The force out of summing junction 39, together with the regulator's spring rate, establishes the position of the regulator's throttling element in the restriction area. A gain factor 40 is applied to the position information to establish the regulator's output flow rate W. The output flow W is compared to the desired, or load flow WL at a summing junction 41. If the output flow W equals the load flow WL, the system is in steady state and the control pressure $P_c$ remains constant. If the system is not in steady state, the PC fed back to the diaphragm, which is shown as a negative (−) force at summing junction 39 will not balance at summing junction 39. This results in the throttling element moving relative to the restriction area until the output of summing junction 39 is zero. In other words, $P_c$ exerts a force on the diaphragm that opposes the force exerted by the load spring to change the position of the throttling element, which adjusts flow, thus regulating pressure.

To compensate for offset and enhance the self operating regulator performance, an indication of the control pressure is also directed to the electronic controller 28. The P/I converter 33, which may be a pressure transducer that is either integral to the regulator or mounted to the adjacent piping external to the regulator, converts $P_c$ to a signal which may be a 4–20 mA signal as provided by a typical analog pressure transducer. The $P_c$ signal is then applied to the electronic controller's PID controller 34. The $P_c$ is multiplied by the derivative constant 42, then applied to a summing junction 43 along with the $P_c$ signal. The output of summing junction 43 is compared to a fine set point signal 44 from an external source such as a host computer or distributed control system at summing junction 45, which produces an error signal. The error signal is applied to the proportional constant 46 and the integral constant 47, and then applied to a summing junction 48 which produces an output signal. The output signal is input to the I/P converter 35, which provides pneumatic pressure to the diaphragm, shown as a positive (+) force at summing junction 39.

The addition of the above discussed processing capabilities to compensate for droop and enhance control also provides a means for enhancing other performance aspects of a pressure regulator, including remote operation and communications, improved process operation, diagnostics capabilities, increased maintainability, trending, alarm capabilities, etc. These added enhancements will become more evident as the electronic controller is discussed further.

Figure 7:
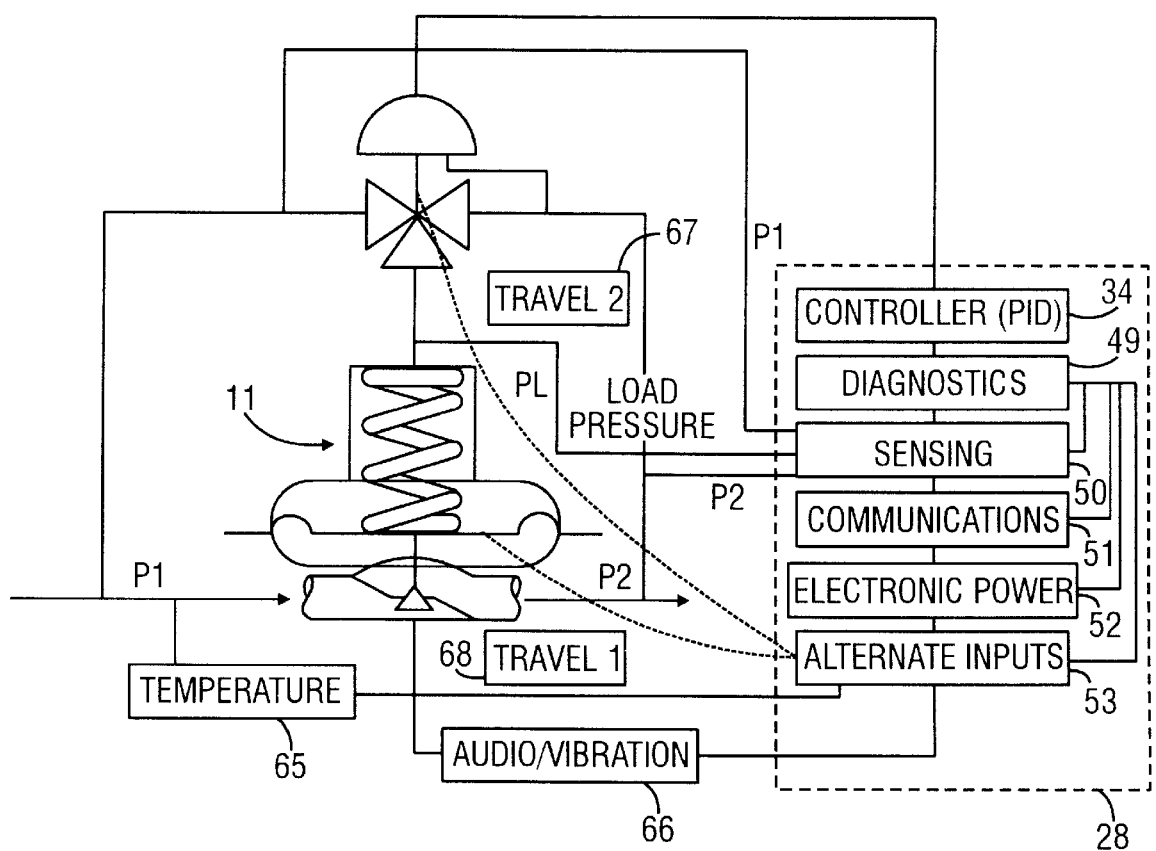
FIG. 7 schematically illustrates the electronic controller of an embodiment of the invention.

An embodiment of the intelligent regulator 10 is illustrated schematically in FIG. 7. The self operating regulator 11 is shown in a schematic view. In addition to the PID controller portion 34 described above, the electronic controller 28 further includes diagnostics 49, sensing 50, communications 51, electronic power 52 and alternate inputs 53 sections. These functional sections of the electronic controller may all be embodied in a microprocessor.

The sensing section 50 provides the error signals to the PID controller 34 based on the signals indicating inlet pressure P1, downstream pressure P2, and actuator loading pressure PL, which are processed according to PID constants. These signals may be provided by sensors integral to the regulator body or from external sensors. Other process variables are received by the alternate inputs section 53. These inputs may include temperature signals 65 from temperature sensors either integral to the regulator or mounted external to the regulators. Audio or vibration transducers 66, for example, provide inputs that may indicate leakage and/or cavitation or flashing in the flow restriction area. Valve stem travel 67 and actuator travel 68 information is supplied to the alternate inputs section 53 via motion transducers to monitor the condition of these elements. Information such as the inputs described above are examples of process elements that may be supplied to the alternate inputs section 53 of the electronic controller 28. Other appropriate process data, such as pH or flow, may also be provided via sensors integral to the regulator or external thereto. Any or all of the above sensor signals may be analog signals which are converted to digital values by the electronic controller.

Baseline diagnostic data can be used to develop a "signature" for a specific regulator, which may be stored in the controller's memory or in the memory of an external system. Performance information provided to the diagnositics section 49 from the sensing section 50 and the alternate inputs section 53 may then be processed and compared to the baseline data, or signature, and the diagnostics section 49 can provide alarms, actual and predicted failures, and other diagnostic information to the system operator if regulator characteristics and performance deviate from the expected signature performance by more than some predetermined amount. The alarm conditions can be reported spontaneously via unsolicited communications to the host computer from the regulator or via polling from the host computer. Polling may occur at predetermined time intervals. Alternately, an alarm device that provides an audio or visual alarm, for example, may signal deviations from the signature. This information may then be used for maintenance forecasting, system performance improvement, life cycle accumulation, etc. Examples of specific information which may be processed by diagnostics section 49 of an embodiment of the invention are discussed as follows.

Figure 8A:
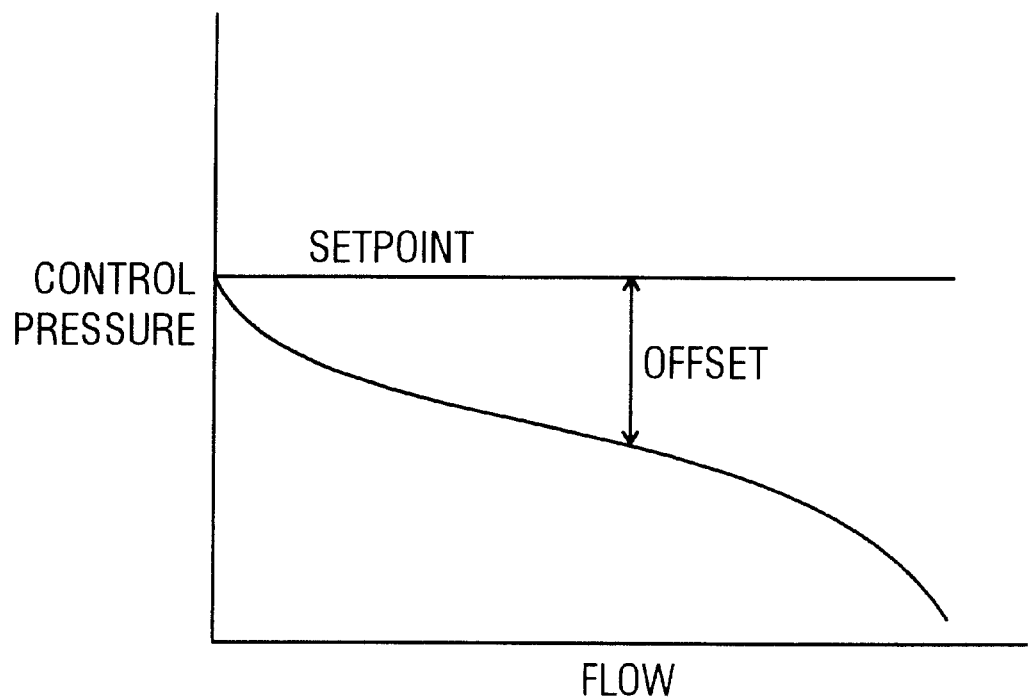
FIG. 8A is a regulator offset chart, plotting set point pressure value and control pressure against flow for a pressure reducing regulator.
Figure 8B:
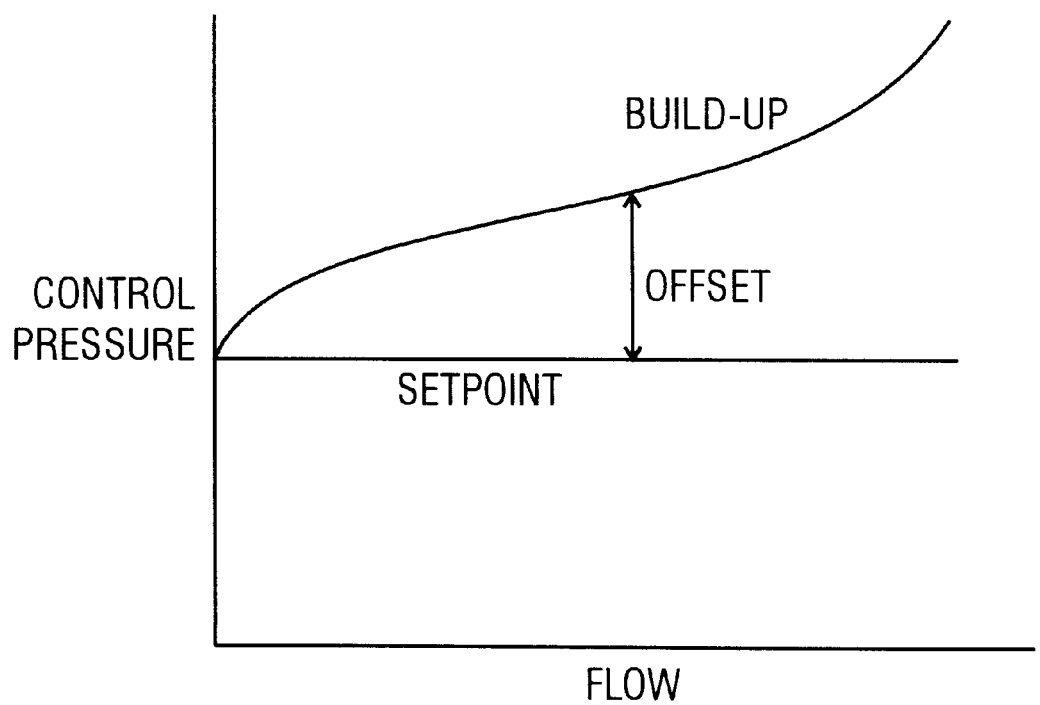
FIG. 8B is a regulator offset chart, plotting set point pressure value and control pressure against flow for a back pressure regulator.

Offset: As described above, known regulators exhibit offset such as droop or build-up. FIGS. 8A and 8B show graphs with the set point pressure value and control pressure for a self operated regulator plotted against flow on the x-axis. The set point value is constant over the flow range. Control pressure for a pressure reducing regulator decreases as the flow rate increases as shown by the curve labeled "Regulator" in FIG. 8A, while control pressure for a back pressure regulator increases as the flow rate increases as illustrated in FIG. 8B (disregarding droop or build-up compensation by the electronic controller). A pilot operated regulator would exhibit a similar curve, though the offset would be smaller. The distance between the droop curve (FIG. 8A) or the build-up curve (FIG. 8B) and the set point curve at a given flow rate is the offset for the regulator. Offset can be locally determined via $$\text{Offset} = \Delta P * K_L$$

where $\Delta P$ is the difference between controlled pressure and inlet pressure, and $K_L$ is a local flow coefficient. The processor of the intelligent regulator can monitor offset and compare it against a baseline value. A change in offset may indicate a problem with the load force (spring) of the regulator, for example. The operator can then be notified of this condition.

Figure 9A:
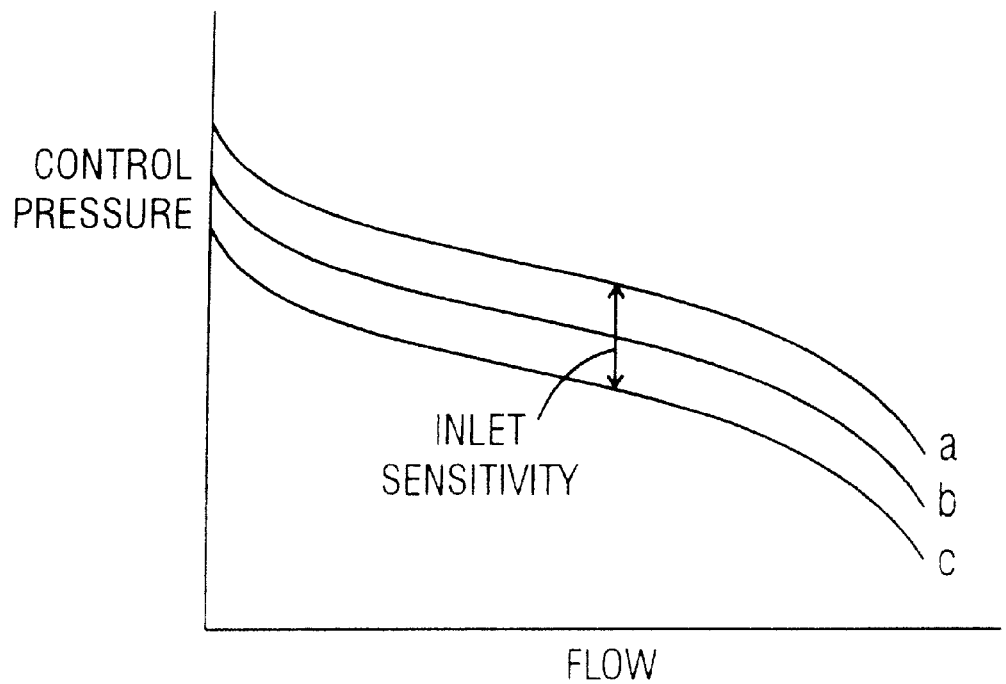
FIG. 9A is a regulator inlet sensitivity chart, illustrating control pressure curves for various inlet pressures for a pressure reducing regulator.
Figure 9B:
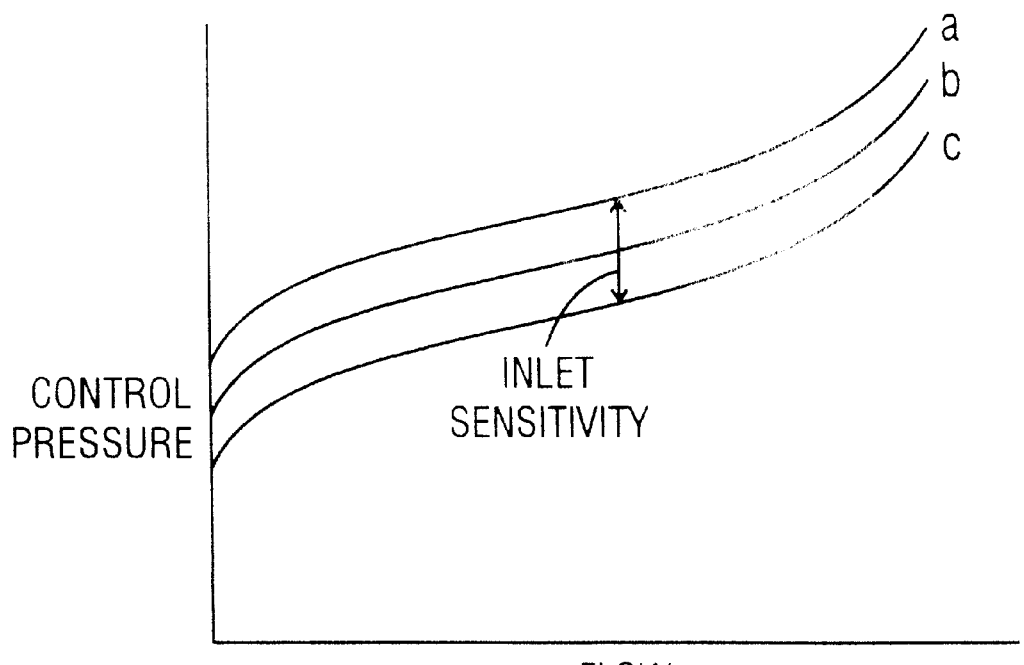
FIG. 9B is a regulator inlet sensitivity chart, illustrating control pressure curves for various inlet pressures for a back pressure regulator.

Inlet pressure sensitivity: FIGS. 9A and 9B each show three plots of control pressure vs. flow rate at various inlet pressures, labeled a, b, and c. This illustrates a regulator's sensitivity to varying inlet pressures. For a given flow rate, the difference between control pressures for different inlet pressures defines inlet sensitivity. The curves in FIG. 9A illustrate inlet sensitivity for a pressure reducing regulator, while FIG. 9B illustrates inlet sensitivity curves for a back pressure regulator. As with offset, the inlet sensitivity can be compared to baseline information to provide diagnostic and failure prediction information from the electronic controller to a user.

Figure 10:
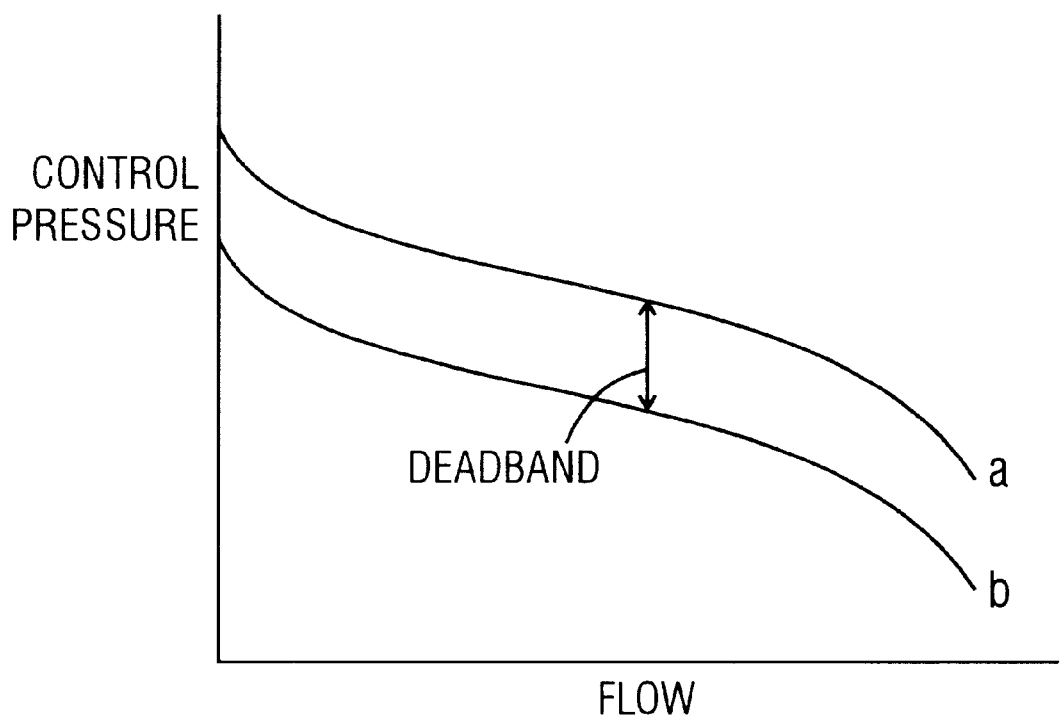
FIG. 10 is a chart illustrating a measure of hysteretic error for a pressure regulator.

Hysteresis and Deadband: Hysteresis is defined as the tendency of an instrument to give a different output for a given input, depending on whether the input resulted from an increase or decrease from the previous value. FIG. 10 illustrates a measure of hysteretic error which includes hysteresis and deadband. The curve labeled "a" shows control pressure plotted against flow rate for a decreasing flow demand. The curve labeled "b" shows a similar curve for increasing flow demand. In other words, curve "a" plots control pressure for given flow rates when the throttling element is moving in a first direction, and curve "b" plots control pressure for corresponding flow rates when the throttling element is moving in the opposite direction. The difference between the two curves is referred to as "deadband." Monitoring the slope of a hysteresis curve can provide information regarding spring constant, for example. A change in deadband or in the slope of a hysteresis curve may indicate or be used to predict problems with the spring, actuator, throttling element or other component of the regulator.

Figure 11A:
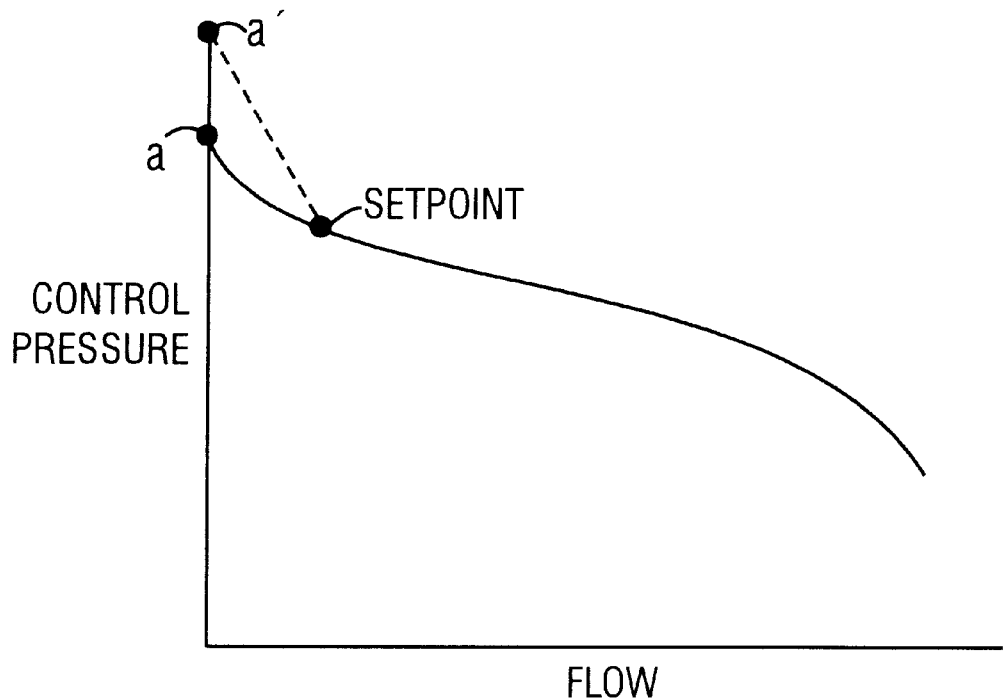
FIG. 11A is a chart illustrating "lock-up" in a pressure reducing regulator.
Figure 11B:
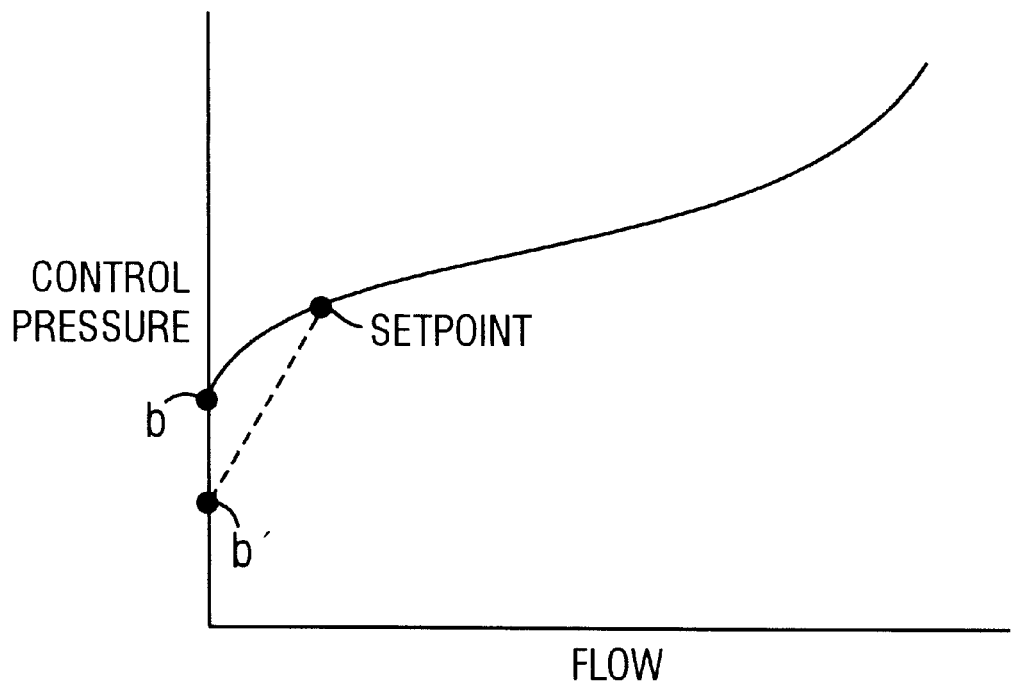
FIG. 11B is a chart illustrating "reseat" in a back pressure regulator.

Lock-up and reseat: FIG. 11A and 11B graphically illustrate the lock-up and reseat conditions. In a pressure reducing regulator (FIG. 11A), when downstream pressure reaches a predetermined point above the set point value, the control pressure should cause the throttling element to move to a completely closed position, thereby preventing fluid flow. The lock-up point is labeled "a" in FIG. 11A. FIG. 11B illustrates reseat, which is the back pressure regulator's counterpart to lock-up. The reseat condition occurs when the up stream pressure drops to a level below the set point such that the throttling element moves to a closed position, labeled "b" in FIG. 11B. The lock-up/reseat control pressure value and the slope of the segment of the regulator pressure curve between the setpoint value and the lock-up or reseat point may be determined and stored in intelligent regulator diagnostics section or an external computer. Alternately, a leakage transducer, such as an audio or seismic transducer, may be used to correlate lock-up or reseat condition with known flow conditions. The regulator's lockup/reseat performance is compared to these baseline values to diagnose regulator operation. Changes in the lock-up/reseat performance may indicate internal parts problems or binding in the movement of the internal parts, for example.

Expected PID control: Overall regulator performance can be achieved by looking at control pressure, offset, flow, and/or hysteretic error and comparing these variables to the performance of the expected PID control. A flow rate may be calculated internal to the electronic controller using parameters of the flow coefficient for the body of the regulator in relationship to the fluid liquid flow, gas flow and steam flow. This internal flow is then compared to actuator travel and a regulator body correction factor to calculate main regulator flow. These calculations may be made in the electronic regulator's processor, or the information may be communicated to a host computer for calculation via the communications section.

Auto tuning: The above factors can also be used for developing P, I and D tuning constants. A step change is input to the set point via the electronic controller, then the output response is measured to perform diagnostics on the system dynamics.

Travel: Actuator travel is an important diagnostic factor. Among other things, actuator travel is used to calculate throttling element loading and position. An example of using travel for diagnostic purposes is to calculate and compare the forces on opposing sides of the diaphragm. The processor's diagnostic section may calculate the force exerted by the regulator load spring on the reference side of the diaphragm:

$$(T_1+I_s) * K_1$$

where $T_1$=actuator travel, $I_s$=the initial spring adjustment as set by the set screw, and $K_1$=the spring constant. This is compared to the force exerted on the control side of the diaphragm:

$$P_c * A$$

where $P_c$=control pressure and A=diaphragm area. In a pilot operated regulator, the pilot acuator travel can also be used for diagnostics in a similar manner. Further, in regulators using an electric motor to adjust the throttling element, the motor voltage and current can be viewed with respect to travel for diagnostics purposes. These comparisons, as well as indications of inlet and control pressure, inlet sensitivity, hysteretic error, and flow are used to provide diagnostic information regarding regulator health and performance.

Flashing and cavitation: These are phenomena encountered in liquid flow which may introduce noise and vibration to the regulator, possibly limiting the regulator's life. Flashing and cavitation both are related to the formation of vapor bubbles in the fluid. When the fluid flows through the restriction area, velocity increases and pressure decreases, which causes the vapor bubbles to form. Once the fluid flows through the restriction, the fluid flow decelerates and the pressure recovers, causing the vapor bubbles to violently collapse. Either audio or vibration sensors may be used to sense the presence of cavitation or flashing directly by comparing the sensed noise/vibration characteristics and comparing them to baseline characteristics, or an alternate process variable, $\Delta P_A$ can be calculated by $$\Delta P_A = K_c(P_1 - r_c P_v)$$

where $K_c$=a cavitation or flashing index, $P_1$=inlet pressure, $r_c$=critical pressure ratio constant and $P_v$=vapor pressure. This value is compared to the input constants of the fluid stream vapor pressure to indirectly ascertain the presence of flashing or cavitation and transmit an alarm.

With the novel diagnostics capabilities added to the regulator, on-line diagnostics may now be performed in the various categories described above and in other areas. An electronic "bump"—a sudden step-change to the set point value—may be introduced into the system. This causes an upset to the process control loop, which the intelligent regulator will attempt to correct. As the regulator reacts to the electronic bump, the regulator's performance with regards to the various factors described above (and other factors) is measured and compared to the regulator's signature by the electronic controller's diagnostics section. This provides a basis to do on-line diagnostics without significantly upsetting or disturbing the process.

Set point, configuration, diagnostics, and other information from the exemplary intelligent regulator may be exchanged with external systems and devices through various communications means. This provides the capability for remotely controlling the regulator, which is an important feature missing from known mechanical pressure regulators. An operator may send commands to the regulator changing operating parameters and report parameters. Further, diagnostic information may be sent to an external system for processing, rather than processing this data within the regulator. The communications capabilities of the exemplary intelligent regulator are especially useful in remote and hazardous environments where maintenance and operations are difficult.

A variety of communications media may be used with the intelligent regulator of the present invention, such as a single twisted pair having communications overlaid on power or modulated with power, a single twisted pair for data communications only, radio, modem, fiber optics, coax, and several other communications technologies. The communications capabilities of the exemplary embodiment of the invention also allow exchanging configuration and control information with other process instruments or with an external control system or host computers.

Figure 12:
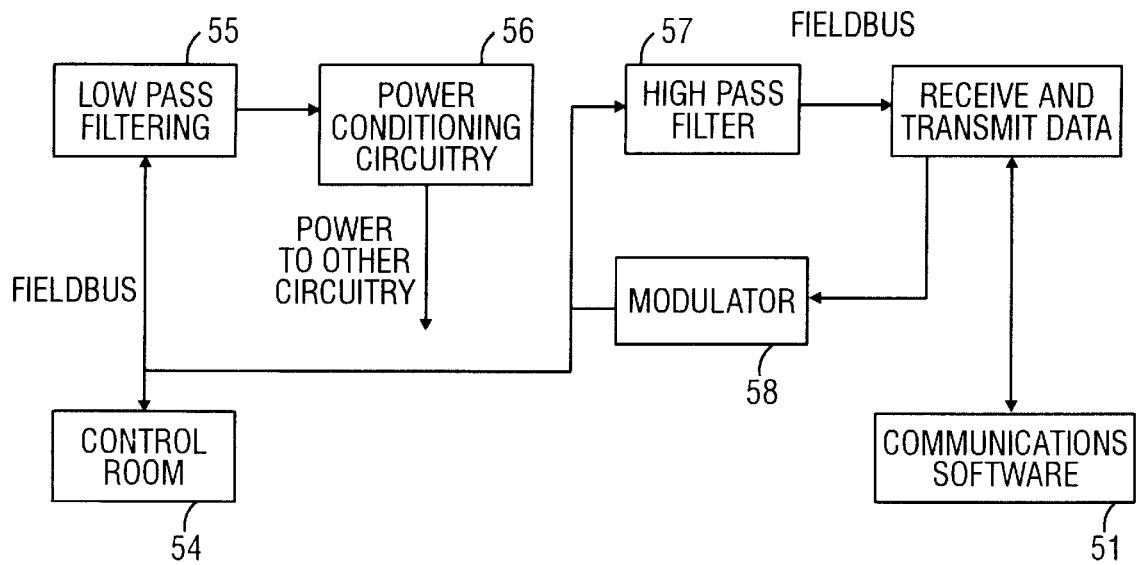
FIG. 12 illustrates a communications link between an intelligent regulator in accordance with the present invention and an external control room using a single twisted pair with Fieldbus.

FIG. 12 illustrates a two wire communications scheme which could be implemented with an embodiment of the intelligent regulator of the present invention using the digital Fieldbus communications protocol, wherein digital data is combined with power for the intelligent regulator's electronic controller on the single twisted pair. The signal sent from the control room 54 is passed through a low pass filter 55 to separate the system power from the data. The power then may be passed through power conditioning circuits 56 and provided to an intelligent regulator in accordance with the present invention and to other devices. The received Fieldbus signal is passed through high pass filters 57 to separate the communications data from the system power, which is then passed on to the electronic controller's communications section 51. Information transmitted back to the host system is passed through a modulator 58 to combine the data with the system power signal.

Figure 13:
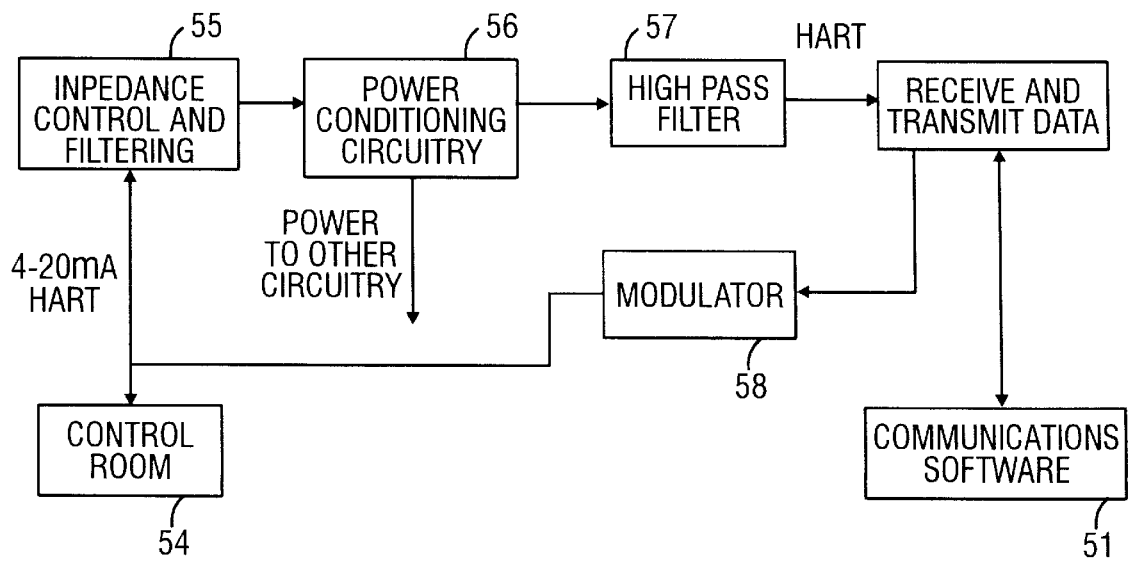
FIG. 13 illustrates a communications link between an intelligent regulator in accordance with the present invention and an external control room using a single twisted pair with HART.

FIG. 13 illustrates an alternate communication scheme which could be implemented with an embodiment of the invention using the HART protocol, wherein the digital communications data is superimposed on a 4–20 mA analog signal. The signal from the control room 54 is passed through impedance control and filtering circuits 59. The 4–20 mA signal is then conditioned to provide the appropriate power to the intelligent regulator and other devices. The received signal is filtered 57 to remove the communications data from the 4–20 mA HART signal, which is passed on to the electronic controller's communications section 51. Transmit data is passed through a modulator 58 to combine the data with the 4–20 mA signal.

Figure 14:
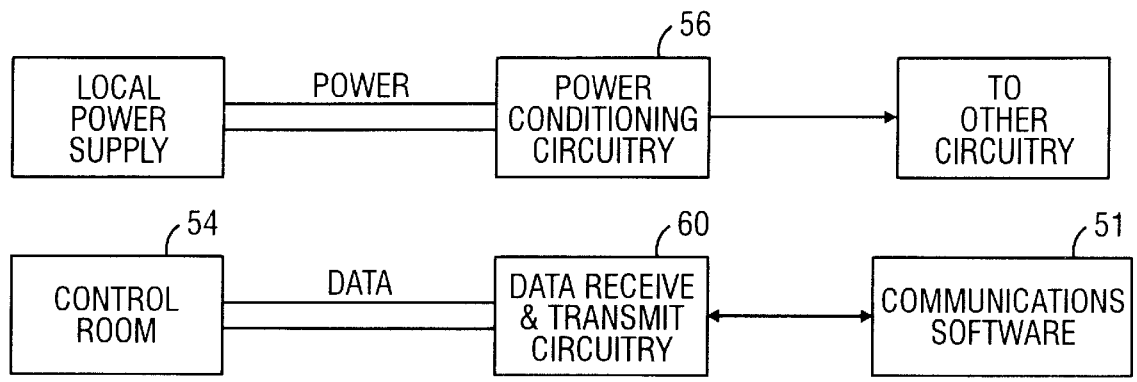
FIG. 14 illustrates a communication link between an intelligent regulator in accordance with the present invention and an external control room using a four-wire, dual twisted pair arrangement.

FIG. 14 illustrates an example of a communications system using dual twisted pairs. Power is conditioned 56 and provided to the intelligent regulator and other devices on one of the two-wire pairs. Data is passed over the other two-wire pair from the control room 54 through transmit and receive circuits 60 to the electronic controller's communications section. 51

Figure 15:
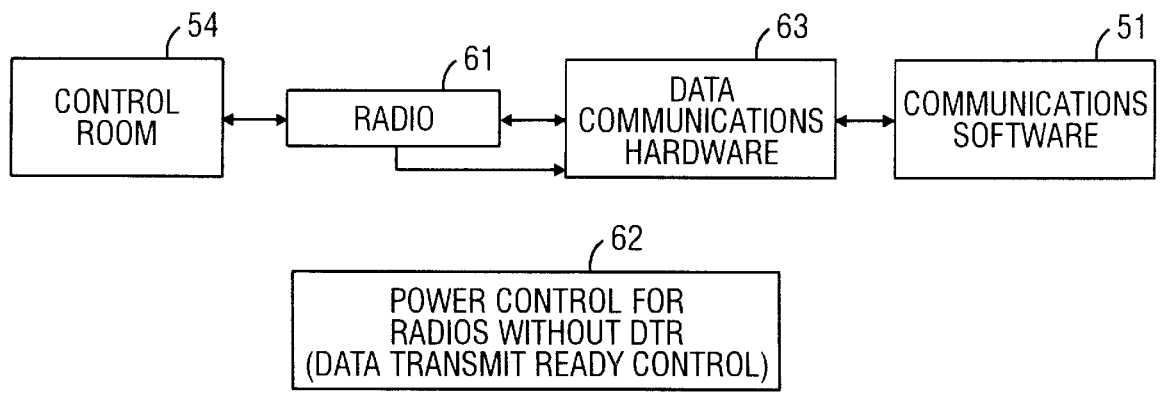
FIG. 15 illustrates a communication link between an intelligent regulator in accordance with the present invention and an external control room using a radio link
Figure 16:
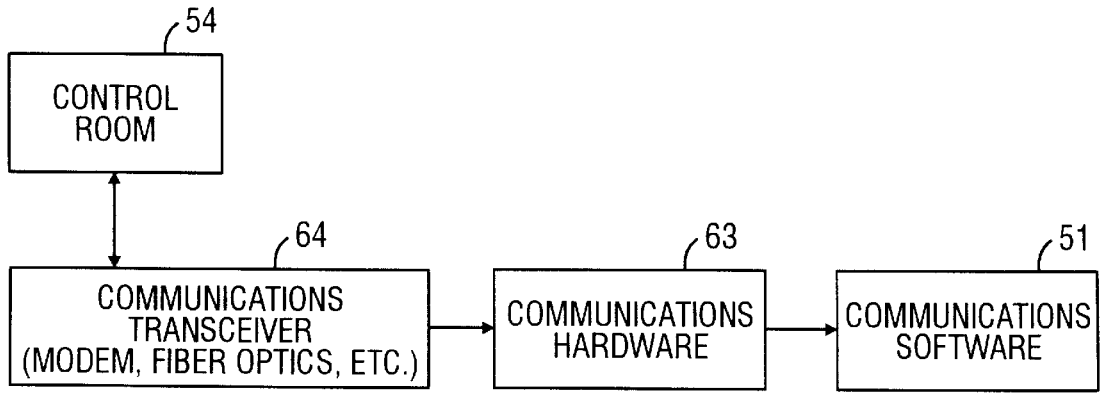
FIG. 16 illustrates a communication link between an intelligent regulator in accordance with the present invention and an external control room using alternate communications means such as modem or fiber optics.

In FIG. 15, an example communications arrangement using radio communications is illustrated. A radio signal containing data is sent from the control room to a radio 61 associated with the intelligent regulator. The signal is passed through a power control device 62 (if the regulator's radio is not equipped with data transmit ready control) and appropriate data communications hardware 63, then the information is provided to the regulator's communications section 51. Similarly, FIG. 16 shows a configuration for communicating between a control room 54 and an intelligent regulator in accordance with the invention using a modem or fiber optics. Other communications media may also be used with a configuration as illustrated in FIG. 16. Data is sent from the control room 54 to an appropriate transceiver 64, which processes the data and passes it through communications hardware 63 to the communications section 51 of the electronic controller.

The above description of several exemplary embodiments is made by way of example and not for purposes of limitation. Many variations may be made to the embodiments and methods disclosed herein without departing from the scope and spirit of the present invention. The present invention is intended to be limited only by the scope and spirit of the following claims.

What is claimed is:

1. A pressure regulator for controlling the pressure of a process fluid comprising:

a body defining a fluid inlet, a fluid outlet, and a fluid flow passage between the inlet and the outlet;

a throttling element moveable within the flow passage;

an actuator coupled to the throttling element for selectively moving the throttling element to control fluid flow through the flow passage;

a spring load coupled to the actuator to bias the throttling element in a predetermined reference position;

a feedback for applying the process fluid to the actuator to position the throttling element, wherein the actuator and the feedback are configured to position the throttling element so as to block fluid flow through the flow passage in response to a predetermined pressure of the process fluid downstream of the regulator; and an electronic controller that applies a force to the actuator to further position the throttling element in response to a process variable.

2. The pressure regulator of claim 1 wherein the actuator comprises a diaphragm.

3. The pressure regulator of claim 1 wherein the electronic controller further comprises a memory structure, wherein the controller is adapted to store digital data concerning the operation of the pressure regulator in the memory structure, and wherein the controller includes a communications circuit for communicating at least some of the stored digital data to devices external to the electronic controller.

4. The pressure regulator of claim 1 wherein the electronic controller includes a communications circuit and a memory, and wherein the controller is adapted to receive through the communications circuit an electrical signal representing a desired pressure of the process fluid and to store a digital representation of that electrical signal in the memory.

5. The pressure regulator of claim 1 further comprising a power source for supplying electrical power to the electronic controller.

6. The pressure regulator of claim 1, wherein the electronic controller is a PID controller.

7. The pressure regulator of claim 1, wherein the reference load is adjustable.

8. The pressure regulator of claim 1, further comprising a sliding stem that couples the actuator to the throttling element.

9. The pressure regulator of claim 1, wherein the at least one process variable includes the pressure of the process fluid downstream of the regulator.

10. The pressure regulator of claim 1, wherein the at least one process variable includes the pressure of the process fluid upstream of the regulator.

11. The pressure regulator of claim 1, wherein the at least one process variable includes the process temperature.

12. The pressure regulator of claim 1, wherein the at least one process variable includes the process flow rate.

13. The pressure regulator of claim 1, wherein the at least one process variable includes the process pH level.

14. The pressure regulator of claim 1, wherein the at least one process variable includes the loading pressure of the actuator.

15. The pressure regulator of claim 8, wherein the at least one process variable includes the valve stem travel.

16. The pressure regulator of claim 1, further comprising a communications circuit for providing a communication signal to external communication devices.

17. The pressure regulator of claim 1, wherein the controller comprises:

at least one sensor providing a signal representing the value of at least one process variable;

a processor receiving the process variable signal and outputting a signal representing an adjustment to the throttling element in response to the difference between the sensed value and a set point; and an adjusting mechanism applying a force to the actuator in response to the signal output by the processor.

18. The pressure regulator of claim 17, wherein the adjusting mechanism comprises an air supply and a current to pressure converter that provides an output pneumatic pressure to the actuator.

19. The pressure regulator of claim 17, wherein the adjusting mechanism comprises a motor.

* * * * *